(12) United States Patent
Perkins et al.

(10) Patent No.: US 10,704,387 B2
(45) Date of Patent: Jul. 7, 2020

(54) FORMATION TESTER COMPRISING REACTIVE FILTER MATERIAL SENSORS

(71) Applicant: Halliburton Energy Services, Inc., Houston, TX (US)

(72) Inventors: David L. Perkins, The Woodlands, TX (US); Christopher Michael Jones, Katy, TX (US); Michael T. Pelletier, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 370 days.

(21) Appl. No.: 15/548,376

(22) PCT Filed: Sep. 27, 2016

(86) PCT No.: PCT/US2016/053869
§ 371 (c)(1),
(2) Date: Aug. 2, 2017

(87) PCT Pub. No.: WO2018/063141
PCT Pub. Date: Apr. 5, 2018

(65) Prior Publication Data
US 2018/0340418 A1 Nov. 29, 2018

(51) Int. Cl.
*E21B 49/08* (2006.01)
*E21B 47/00* (2012.01)
(Continued)

(52) U.S. Cl.
CPC .......... *E21B 49/082* (2013.01); *E21B 43/105* (2013.01); *E21B 47/0007* (2013.01);
(Continued)

(58) Field of Classification Search
CPC ....... E21B 49/10; E21B 47/0007; E21B 47/10
See application file for complete search history.

(56) References Cited

U.S. PATENT DOCUMENTS

| 4,572,706 A | 2/1986 | Tsuruta |
| 7,501,012 B2 | 3/2009 | Tatarchuk et al. |

(Continued)

FOREIGN PATENT DOCUMENTS

| EP | 0061865 A1 | 10/1982 |
| WO | 2014104070 A1 | 7/2014 |

(Continued)

OTHER PUBLICATIONS

EP Application Serial No. 16 917 855.5, Extended European Search Report, dated Jul. 5, 2019, 10 pages.

(Continued)

*Primary Examiner* — Daniel S Larkin
*Assistant Examiner* — Anthony W Megna Fuentes
(74) *Attorney, Agent, or Firm* — Gilliam IP PLLC

(57) ABSTRACT

The embodiments herein relate to sensors having reactive filter materials for detecting analytes in wellbores. The sensor includes at least one reactive filter material arranged in a flow line, wherein the reactive filter material sorbs an analyte in a wellbore fluid in the flow line; and at least one detector that detects a sorption signal specific to the analyte at at least a first location and a second location of the reactive filter material, wherein the first location is upstream in the flow line relative to the second location. The detector either (1) calculates a balanced measurement corresponding to the presence of the analyte in the wellbore or (2) relays the measurements to a signal processing unit to calculate a balanced measurement corresponding to the presence of the analyte in the wellbore.

24 Claims, 3 Drawing Sheets

(51) Int. Cl.
*E21B 47/10* (2012.01)
*E21B 49/10* (2006.01)
*E21B 43/10* (2006.01)
*G01N 1/40* (2006.01)

(52) U.S. Cl.
CPC .............. *E21B 47/10* (2013.01); *E21B 49/10* (2013.01); *G01N 1/405* (2013.01)

(56) References Cited

U.S. PATENT DOCUMENTS

| | | | | |
|---|---|---|---|---|
| 8,156,800 | B2* | 4/2012 | Terabayashi | ............ E21B 49/10 |
| | | | | 73/152.27 |
| 8,420,023 | B2 | 4/2013 | Tatarchuk et al. | |
| 8,425,763 | B2 | 4/2013 | Tatarchuk et al. | |
| 8,603,229 | B2 | 12/2013 | Tatarchuk et al. | |
| 2002/0092649 | A1 | 7/2002 | Bixenman et al. | |
| 2003/0085039 | A1 | 5/2003 | DiFoggio | |
| 2003/0134426 | A1 | 7/2003 | Jiang et al. | |
| 2004/0031313 | A1 | 2/2004 | Tanida et al. | |
| 2004/0045350 | A1* | 3/2004 | Jones | ................. E21B 43/38 |
| | | | | 73/152.23 |
| 2005/0109098 | A1 | 5/2005 | Difoggio | |
| 2009/0158820 | A1 | 6/2009 | Bostrom et al. | |
| 2010/0193187 | A1* | 8/2010 | Briquet | ................. E21B 49/081 |
| | | | | 166/264 |
| 2011/0023588 | A1* | 2/2011 | Westner | ................. G01N 21/85 |
| | | | | 73/61.63 |
| 2013/0245947 | A1 | 9/2013 | Samsom et al. | |
| 2015/0112599 | A1 | 4/2015 | Proett et al. | |
| 2016/0001258 | A1 | 1/2016 | Fish et al. | |
| 2017/0212272 | A1* | 7/2017 | Monteiro | ............... G01N 21/77 |

FOREIGN PATENT DOCUMENTS

| | | |
|---|---|---|
| WO | 2015088493 A1 | 6/2015 |
| WO | WO-2016/032437 A1 | 3/2016 |
| WO | WO-2016/133528 A1 | 8/2016 |

OTHER PUBLICATIONS

IntraMicron, Inc., "Microfibrous Entrapment Technology," retrieved from http://www.intramicron.com/tech_entrap.php, © 2011, 2 pages.
IntraMicron, Inc., "Microfibrous Entrapped Sorbents (MFESs)," retrieved from http://www.intramicron.com/tech_mfes.php, © 2011, 2 pages.
IntraMicron, Inc., "Microfibrous Media Technology," retrieved from http://www.intramicron.com/tech_mfm.php, © 2011, 2 pages.
IntraMicron, Inc., "H2S Fuel Cell Sorbent Filter," retrieved from http://www.intramicron.com/prod_fuelcellfilter.php, © 2011, 2 pages.
Hamed-Pourzolfaghar, et al., "Review of H2S Sorbents at Low-Temperature Desulfurization of Biogas," Int. J. of Chem. and Envtl. Engineering, vol. 5:1 (2014) retrieved from http://www.academia.edu/7117434/Review_of_H2S_Sorbents_at_Low-Temperature_Desulfurization_of_Biogas, 7 pages.
International Search Report and Written Opinion from PCT/US2016/053869, dated Jun. 26, 2017, 14 pages.

\* cited by examiner

FORMATION TESTER COMPRISING REACTIVE FILTER MATERIAL SENSORS

BACKGROUND

The embodiments herein relate generally to apparatus and methods for use in subterranean formation operations and, more particularly, to reactive filter materials and methods of use thereof for detecting analytes in subterranean formation operations.

Hydrocarbon fluids, including oil and natural gas, are obtained from wellbores drilled into subterranean formations (or simply "formations") having hydrocarbon-rich reservoirs. After the wellbore is drilled, it is completed by installation of specially designed equipment and materials to facilitate and control hydrocarbon production. At any point during the design, drilling, and completion of a particular wellbore, it may be desirable to obtain certain information about the characteristics of the wellbore fluids from the formation. As used herein, the term "wellbore fluids," and grammatical variants thereof, refers to, any fluid recoverable from a wellbore (liquid or gaseous phase), that is not an unaltered introduced treatment fluid (i.e., not a fluid that was placed into the wellbore, unless said placed fluid has been comingled with a fluid from the wellbore or in contact with the subterranean formation). As used herein, the term "treatment fluid," and grammatical variants thereof, refers to any fluid that may be used in a subterranean application in conjunction with a desired function and/or for a desired purpose, and does not imply any particular action by the fluid or any component thereof. Accordingly, wellbore fluids may be oil, gas, water, and the like, and included any recovered fluid (including treatment fluids) that has been contacted with a portion of the subterranean formation or a fluid naturally occurring therein.

It may be desirable to determine whether deleterious materials (e.g., corrosive materials, metallurgic reactant materials, and the like) are present within wellbore fluids. Such deleterious materials can affect equipment and/or operators involved in upstream, midstream, and downstream oil and gas sectors. As used herein, the "upstream sector" refers to exploration and production of crude formation fluids; the "midstream sector" refers to transportation and storage of crude formation fluids; and the "downstream sector" refers to refinement of crude formation fluids, including processing and purifying raw natural gas.

BRIEF DESCRIPTION OF THE DRAWINGS

The following figures are included to illustrate certain features and inventive aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
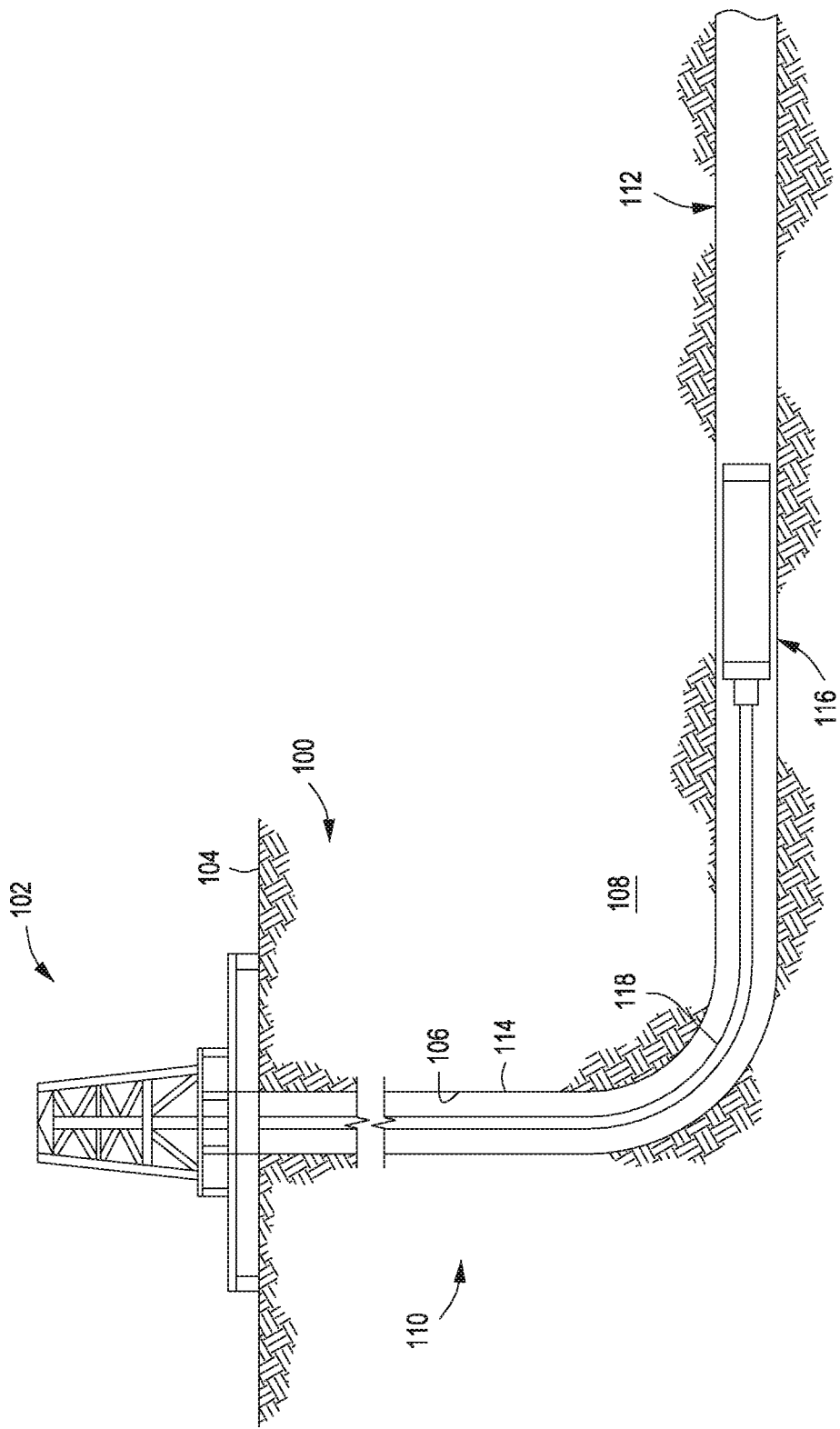
FIG. 1 is a well system that can employ one or more principles of the present disclosure, according to one or more embodiments.

The embodiments herein relate generally to apparatus and methods for use in subterranean formation operations and, more particularly, to reactive filter materials and methods of use thereof for detecting analytes in subterranean formation operations.

Specifically, the embodiments herein employ reactive filter materials within a fluid flow line that are able to absorb or adsorb an analyte of interest within a wellbore fluid. As used herein, the term "reactive filter material," and grammatical variants thereof, refers to a material that is capable of at least absorption (the incorporation of a substance in one state into another of a different state) or adsorption (the physical adherence or bonding of ions and molecules onto the surface of another molecule) (collectively "sorption," and grammatical variants thereof) an analyte within a wellbore fluid. Thus, the reactive filter may additionally be capable of desorbing the analyte, without departing from the scope of the present disclosure. The term "analyte," and grammatical variants thereof, as used herein, refers to a material (or substance) having chemical and/or physical attributes capable of being qualitatively and/or qualitatively detected.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. For example, if the numerical value is "about 80%," then it can be 80%+/−5%, equivalent to 76% to 84%. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

The reactive filter material described herein can be used alone in a flow line (i.e., not in combination with a detector for forming a sensor, as described below), where one or more reactive filter materials are selected to sorb particular analytes. In other embodiments, the reactive filter material can be combined with at least one detector that detects a signal (e.g., a sorption signal) specific to the analyte at one or more locations of the reactive filter material, as described in greater detail below. Accordingly, in some embodiments, the reactive filter material is simply used as a trap to sorb and remove analytes from a wellbore fluid in a flow line, whereas in other embodiments, the reactive filter material is used separately, or additionally, as a sensor in combination with at least one detector to determine a qualitative or quantitative concentration of the analyte.

The embodiments herein employ one or more reactive filter materials for detection of an analyte of interest within a wellbore fluid, including deleterious analytes, which may be of particular interest. Although some of the embodiments below are described with reference to sorption, detecting, and/or measuring potentially or known deleterious analytes, it is to be appreciated that non-deleterious analytes may also be sorbed, detected, and/or measured, without departing from the scope of the present disclosure. That is, any desired analyte that is capable of being at least sorbed by a reactive filter material, as described herein, may be removed from a wellbore fluid, detected, and/or measured in accordance with the embodiments of the present disclosure.

The reactive filter materials (including those forming the sensors described below) may be used in the upstream sector, midstream sector, or downstream sector processes and/or equipment, without departing from the scope of the present disclosure. As used herein, the term "reactive filter material," and grammatical variants thereof, encompasses both the reactive filter material alone and used as part of a sensor having the reactive filter material itself and at least one detector, unless otherwise specified. For example, the reactive filter materials may be employed in a downhole formation testing tool (alone, or as part of a sensor) within a wellbore that sorbs, monitors, analyzes, and/or brings wellbore fluid samples to surface. Such formation testing tools are sealed tools that typically contain a passage or flow channel that is used to withdraw fluid directly from the formation. The formation fluid is collected within the tool and analyzed in the wellbore using the frequency sensors described herein, and can additionally be brought to the surface for duplicate or further analysis, which may or may not employ the reactive filter material described herein.

When used in a formation tester, the reactive filter material is located in a fluid flow line therein. In some embodiments, the reactive filter material is preferably located in the fluid flow line downstream of a sample chamber, such that an accurate reading of the wellbore fluid can be measured in the sample chamber. With regard to the fluid flow lines described herein, the term "downstream," and grammatical variants thereof, refers to locations along the fluid flow line that are relatively closer to the exit end of the fluid flow line (e.g., where a wellbore fluid exits, such as a port) and the term "upstream," and grammatical variants thereof, refers to locations along the fluid flow line that are relatively closer to the entry end of the fluid flow line.

In some embodiments, the reactive filter material is preferably located in the fluid flow line downstream of a sample chamber and as close to an exit end of the flow line, such that prior to the collected wellbore fluid exiting or otherwise being removed from the formation tester, the reactive filter material is able to sorb an analyte (e.g., a deleterious analyte) prior to exposing the wellbore fluid to the outside environment (i.e., outside of the formation tester). In such a manner, the reactive filter material additionally serves as a built-in safety mechanism against exposure to the environment and/or operator personnel to certain analytes because the reactive filter material sorbs all or at least a portion of the analyte prior to allowing the wellbore fluid to be exposed to an environment outside of the formation tester. Moreover, the strategic location of the reactive filter material permits accurate and unadulterated measurement and/or other analysis of wellbore fluid in one or more sample chambers in the formation tester.

In some embodiments, the reactive filter material may be used at one or more locations in a fluid flow line during any or all of upstream, midstream, and downstream sector operations or processes. For example, the reactive filter material may be located in an annulus in a subterranean formation, in production equipment, and/or in transport and storage equipment (e.g., a pipeline, a truck, a rail car, an oil tanker, a barge) for conveying the wellbore fluid to one or more locations or for maintaining it at a particular location. Additionally, the reactive filter material may be utilized in processing, refining, and purifying equipment that contacts the wellbore fluid. Accordingly, the reactive filter material may be located in an oil or gas fluid flow line at one or more downhole and/or surface locations. In some embodiments, the reactive filter material (whether alone or forming a sensor) can be located at a downhole location and then retrieved to a surface location for analysis and comparison to the downhole location, thereby enabling a more accurate measuring of a particular subterranean formation operation (e.g., a pumpout). Surface location analysis and comparison may also enable extrapolation of the analyte concentration to reservoir concentration with higher accuracy.

The reactive filter material is able to sorb desired analytes, but also when used in forming a sensor in accordance with the present disclosure, measure qualitatively or quantitatively a desired analyte. In some instances, the reactive filter material is used to achieve both functions. Accordingly, one or more desired analytes can be monitored throughout all or a portion of a wellbore fluid's lifetime prior to delivery to an end-user, or one or more desired analytes can be sorbed thus increasing the safety of the environment or individuals coming in contact with the wellbore fluid. Moreover, interactions with specific equipment can be pinpointed or otherwise elucidated that result in increasing or decreasing levels of one or more desired analytes when such analytes are qualitatively or quantitatively measured and/or analyzed.

As previously mentioned, deleterious analytes may be particularly desirable to detect and/or sorb in formation fluids. For example, mercury present in wellbore fluid (e.g., in a gaseous fluid flow line in a formation tester or from a formation, such as a pipeline, storage equipment, or processing equipment) can result in metallurgical equipment failures (e.g., heat exchange equipment) due to amalgamation of the equipment surfaces with the mercury in the wellbore fluid. Such amalgamation may cause equipment failure or reduce the efficacy or efficiency of the equipment.

Indeed, in some instances, wellbore fluids can contain upwards of 500 grams (g) of elemental mercury, which can significantly affect equipment, operations, and costs. As another example, hydrogen sulfide ($H_2S$) present in wellbore fluid can result in environmental, health, and safety concerns (e.g., when exposed to the outside environment and/or operational personnel). Hydrogen sulfide is extremely poisonous, corrosive, flammable, and explosive. It can cause stress corrosion cracking when combined with water, resulting in micro-cracks in metal equipment that reduces the metal's tensile stress (and thus the stress at which it may fail). Other than mercury and hydrogen sulfide, additional analytes of interest include, but are not limited to, a salt, carbon dioxide, and any combination thereof, as discussed in greater detail below.

As described above, in some embodiments, the reactive filter material of the present disclosure may be present in a fluid flow line in a formation tester and/or any other flow line (e.g., an annulus) within a subterranean formation, such as a wellbore. Referring now to FIG. 1, illustrated is a well system 100 that may embody or otherwise employ one or more principles of the present disclosure, according to one or more embodiments. As illustrated, the well system 100 may include a service rig 102 (also referred to as a "derrick") that is positioned on the earth's surface 104 and extends over and around a wellbore 106 that penetrates a subterranean formation 108. The service rig 102 may be a drilling rig, a completion rig, a workover rig, or the like. In some embodiments, the service rig 102 may be omitted and replaced with a standard surface wellhead completion or installation, without departing from the scope of the disclosure. While the well system 100 is depicted as a land-based operation, it will be appreciated that the principles of the present disclosure could equally be applied in any sea-based or sub-sea application where the service rig 102 may be a floating platform or sub-surface wellhead installation, as generally known in the art.

The wellbore 106 may be drilled into the subterranean formation 108 using any suitable drilling technique and may extend in a substantially vertical direction away from the earth's surface 104 over a vertical wellbore portion 110. At some point in the wellbore 106, the vertical wellbore portion 110 may deviate from vertical relative to the earth's surface 104 and transition into a substantially horizontal wellbore portion 112, although such deviation is not required. That is, the wellbore 106 may be vertical, horizontal, or deviated (slanted from true vertical or true horizontal), without departing from the scope of the present disclosure. In some embodiments, the wellbore 106 may be completed by cementing a string of casing 114 within the wellbore 106 along all or a portion thereof. As used herein, the term "casing" refers not only to casing as generally known in the art, but also to borehole liner, which comprises tubular sections coupled end to end but not extending to a surface location. In other embodiments, however, the string of casing 114 may be omitted from all or a portion of the wellbore 106 and the principles of the present disclosure may equally apply to an "open-hole" environment.

The reactive filter material alone or for use in forming a sensor may be placed at any location within a fluid flow line in the subterranean formation 108, such as along the wellbore 106 either inside or outside of the casing 114, provided that the reactive filter material comes into contact with a wellbore fluid in the fluid flow line. In some embodiments, as previously described, the reactive filter material is present in a formation tester, where the reactive filter material is in a fluid flow line of the formation tester downstream of a sample chamber (see FIG. 2). As shown, therefore, the well system 100 may further include a formation tester 116 that may be conveyed into the wellbore 106 on a conveyance 118 (also referred to as a "tool string") that extends from the service rig 102. The conveyance 118 that delivers the formation tester 116 downhole may be, but is not limited to, wireline, slickline, an electric line, coiled tubing, drill pipe, production tubing, or the like.

The formation tester 116 may be conveyed downhole to a target location (not shown) within the wellbore 106. At the target location, the formation tester may be actuated or "set" against a wall of the wellbore 106 and otherwise provide a point of contact for fluid extraction from the subterranean formation 108. In some embodiments, the formation tester 116 is pumped to the target location using hydraulic pressure applied from the service rig 102 at the surface 104, where the conveyance 118 serves to maintain control of the formation tester 116 as it traverses the wellbore 106 and provides the necessary power to actuate and set the formation tester 116 upon reaching the target location. In other embodiments, the formation tester 116 freely falls to the target location under the force of gravity to traverse all or part of the wellbore 106.

It will be appreciated by those skilled in the art that even though FIG. 1 depicts the formation tester 116 as being arranged and operating in the horizontal portion 112 of the wellbore 106, the embodiments described herein are equally applicable for use in portions of the wellbore 106 that are vertical or deviated. It should also be noted that a plurality of formation testers 116 may be placed in the wellbore 106. In some embodiments, for example, several (e.g., two or more) formation testers 116 may be arranged in the wellbore 106 to collect formation fluid at various target locations. In other embodiments, a single formation tester 116 having various sample chambers can be actuated or set at various locations along the wellbore 106 to collect formation fluids at various target locations.

Figure 2:
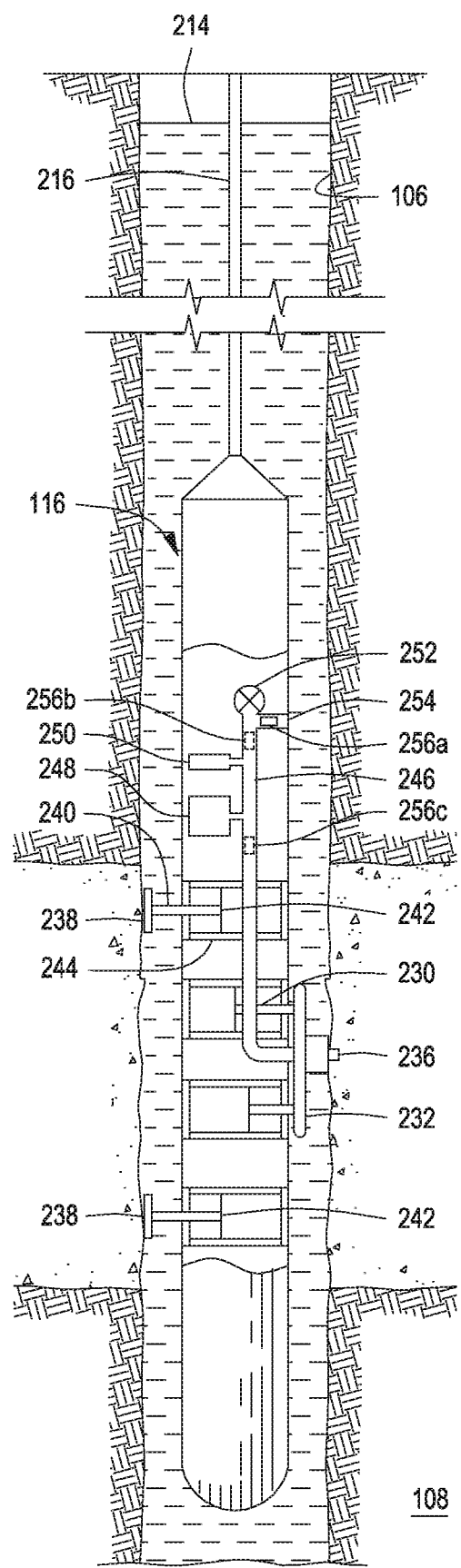
FIG. 2 is a diagram of a formation tester comprising a reactive filter material of the present disclosure, according to one or more embodiments.

Referring now to FIG. 2, with continued reference to FIG. 1, a portion of a wellbore 106 is shown in a subterranean formation 108. The wellbore 106 is shown to be open hole, however, as described above, the wellbore 106 may be partly or wholly cased with a casing string, which may or may not be cemented, in such a way that allows the formation tester 116 to contact the formation 108, without departing from the scope of the present disclosure. The wellbore 106 may, as shown, be filled with a fluid 214, such as a drilling fluid (i.e., drilling mud). Formation tester 116 is suspended in the wellbore 106 by means of a conveyor 216. The conveyor 216 may lead to a rig at the surface (see FIG. 1). The conveyor 216 may be an armored cable, such as a well logging cable or wireline, having electrical conductors enclosed in the cable and connected to a power source at the surface for receiving and/or transmitting signals. The cable may also have optical fibers for the bidirectional transmission of data and optical power. The conveyor 216 may also be a drill string consisting of connected pipe lengths deployed on a drilling rig or a continuous length of tubing deployed by a coiled tubing unit or slickline. The conveyor 216 may use wire, optical fiber, acoustic pulses, or electromagnetic signals, for example, to convey data to and from the formation tester 116. The length of the conveyor 216 may depend on the depths the formation tester 116 and the distance in the formation it is expected to traverse to perform formation testing and may be, in some instances, tens of thousands of feet.

The body of the formation tester 116 is depicted as elongate and cylindrical in shape, however the body of the formation tester 116 may be any shape that can be extended into the wellbore 106, without departing from the scope of the present disclosure. The formation tester 116 has a probe 230 that laterally extends therefrom. The extended probe 230 may be surrounded by a sealing pad 232, as shown, intended to form a seal with the subterranean formation 108 once the probe 230 is extended and contacted therewith. The sealing pad 232 may be formed into a loop to encircle the probe 230. The sealing pad 232 may be composed of an elastomeric material or other elastic material capable of forming a seal with the subterranean formation 108. A more conventional expandable element may also be used to create a seal with the formation 108 similar to that used in drill stem testing, without departing from the scope of the present disclosure. There may be a single expandable element with probe openings on its surface, two expandable elements isolating a sealed interval of the wellbore for testing, or more, without departing from the scope of the present disclosure.

Formation fluid from the subterranean formation 108 is tested by extending the sealing pad 232 against the wellbore 106 to contact the jacking leg 242 and extending a probe snorkel tube 236 from the probe 230. The seal formed by the sealing pad 232 and the formation 108 is intended to prevent invasion of open hole pressure or wellbore fluids (e.g., drilling fluids) into the vicinity of the extended probe snorkel tube 236. The probe snorkel tube 236 is connected to a flow line 246 within the body of the formation tester 116. The flow line 246 has an entry end connected to the probe snorkel tube 236 for receiving formation fluid and an exit end connected to an outlet 254 for removing the formation fluid from the tester 116. The outlet 254 can be selectively opened or closed for removing formation fluid from the tester 116 or retaining formation fluid in the tester 116, respectively.

Formation testing typically occurs after the sealing pad 232 is positioned against the wellbore 106 of the formation 108 and clamping mechanisms 238 are extended laterally from the formation tester 116 and against a portion of the wellbore 106 of the formation 108 to hold the formation tester 116 in place at a depth in the wellbore 106. The clamping mechanisms 238 may operate by actuating a piston 242 and a piston rod 240 in a hydraulic cylinder 244. A similar mechanism may laterally extend the probe 230 to contact the sealing pad 232 against the formation 108. However, the clamping mechanisms 238 and probe 230 may also operate to hold the formation tester 116 in the wellbore 106 or form a seal with the formation 108, respectively, by any other mechanism, without departing from the scope of the present disclosure.

As depicted, the clamping mechanisms 238 are disposed on the body of the formation tester 116 opposite the probe 230; however they may be located at any position on the body of the formation tester 116 so long as they are able to hold the formation tester 116 in place during formation testing, without departing from the scope of the present disclosure. Additionally, while two clamping mechanisms 238 are shown, one or more than two may also be employed, without departing from the scope of the present disclosure. Furthermore, a formation tester 116 may also have fixed clamping extensions or features that do not extend from the body of the tester 116 but are clamping points when the probe 230 is extended and push the tester 116 against the wellbore 106, without departing from the scope of the present disclosure.

During formation testing, the formation tester 116 is first positioned such that the sealing pad 232 and the one or more clamping mechanisms 238 are in contact with the formation 108. The probe snorkel tube 236 is connected to a flow line 246, and the flow line 246 is connected to a sample chamber 248 (which may be a pretest sample chamber), a gauge 250, and an equalization valve 252. In some embodiments, the sample 20 chamber 248 may be have a volume of about 10 cubic centimeters ($cm^3$) to about 100 $cm^3$, encompassing any value and subset there between. Within the flow line 246 between the probe snorkel tube 236 and the exit to the wellbore 106 may be a pump (not shown). This pump can reduce the fluid pressure at the probe snorkel tube 236. Which causes formation fluid to enter the tool and flow past the sample chamber(s) 248, pressure gauges, and any sensor or sensor packages 25 (e.g., a sensor having reactive filter material 256a and/or 256b, or more than one of such reactive filter materials) within or attached to the flowline. The sample chamber 248 is used to collect formation fluid and perform testing immediately on the fluid retained in the sample chamber 248 (e.g., performing pretests) or for storing the fluid in the sample chamber 248 until the formation tester 116 is removed to the surface and the fluid is collected for testing 30 outside of the tester 116. In some embodiments, the sample chamber 248 is rated to a particular pressure differential. One or more additional components may be connected to the flow line 246, without departing from the scope of the present disclosure. For example, additional sample chambers 248 may be located in fluid communication with the flow line 246 for collecting formation fluid. The gauge 250 measures pressure and temperature Once the formation tester 116 is positioned, formation fluid can be drawn into the flow line 246. Typically, as the fluid is drawn into the tester 116, the gauge 250 begins measurement operations, for example, by reading the hydrostatic wellbore pressure. The gauge 250 typically includes a temperature sensor temperature that is also 5 recording temperature and is used for gauge calibration corrections, as well. The equalization valve 252 is normally open when the gauge 250 recording begins so that the pressure in the flow line 246 is equalized with the hydrostatic pressure of the fluid 214 in the wellbore 106 (also referred to as "wellbore hydrostatic pressure" or "wellbore mud hydrostatic pressure"). The equalization valve 252 is closed either before or after extending the probe 230 which 10 isolates the flow line 246 from the wellbore 106 when the probe 230 makes sealing contact. A small piston (not shown) in the formation tester 116 then moves at a constant rate to create a drawdown flow rate. Other methods may also be used to move formation fluid into the formation tester 116, such as a pump or by opening a valve to a chamber, such that the flow rate and volume are controlled, without departing from the scope of the present disclosure.

Fluid is withdrawn or produced from the formation 108 through the probe snorkel tube 236 and into the flow line 246. As the fluid is drawn into the formation tester 116, the gauge 250 continues measurement operations, recording a decrease in pressure as the formation fluid is produced into the flow line 246. The pressure in the flow line 246 increases when the production of fluid from the formation 108 has stopped, and thereafter, the flow line 246 is again exposed to hydrostatic pressure by opening the equalization valve 252. To retrieve the formation tester 116 to the surface, and the probe 230 and clamping mechanisms 238 are retracted (e.g., toward or into the body of the formation tester 116).

It is to be appreciated that other configurations of the flow line in the body of a formation tester other than that shown in FIG. 2 may be suitable, without departing from the scope of the present disclosure. For example, multiple sample chambers may extend from the flow line, additional gauges may be present, additional equalization valves may be present, the order of sample chamber(s)/gauge(s)/equalization valve(s) along the flow line may vary in any order, and the like.

The reactive filter materials (again, encompassing both the reactive filter material alone or forming part of a sensor) as described herein, may be in one or more fluid flow lines for sorbing and/or analyzing a fluid analyte from the wellbore or the surrounding reservoir. For example, the fluid flow line may be one outside of a wellbore, but through which a collected formation fluid is flowed. By way of example, as part of a Drill Stem Testing (DST) string, which may be conducted during a shut-in time, or for example at a time that is later in well life than typical use of formation evaluation testing tools on wireline but before the installation of one or all completion components. In such cases, the flow line may be part of the DST string, or installed at surface before a choke.

In other examples, the flow line may be the same or similar to fluid flow line 246, for example, in a formation tester 116. As shown, the reactive filter material 256a is located in the flow line 246. As depicted, and in a preferred embodiment, the reactive filter material 256a is depicted downstream of the sample chamber 248 and in close proximity to the exit end of the flow line 246 (e.g., adjacent to and connectable to the outlet 254). Accordingly, sorption of a wellbore analyte by the reactive filter material 256a will not affect the integrity of the fluid in the sample chamber 248 (which may be collected directly from the chamber 248, rather than through the flow line 246 and out the exit end connectable to the outlet 254 (not shown)), but will act as a built in safety mechanism for operators when opening the exit end of the flow line 246 using the outlet 254 (e.g., at a surface location). In other preferred embodiments, the reactive filter material is located along the flow line 246 further upstream of the exit end of the flow line 246, but still downstream of the sample chamber 248, such as the location of reactive filter material 256b, shown in phantom. Generally, it is preferred that the reactive filter material be located along the flow line 246 as close to the exit end as possible. In yet other embodiments, however, where the removal of one or more wellbore analyte(s) from a collected formation fluid is not of concern, the location of the reactive filter material may be along the flow line 246 upstream of the sample chamber 248, such as the location of reactive filter material 256c, shown in phantom.

It is to be appreciated that one or more reactive filter materials may be included along the fluid flow line 246 in the tester 116 (or along any other fluid flow line, as described herein) for sorbing and/or measuring a wellbore analyte flowing within the flow line. The presence of more than one reactive filter material (e.g., in-line in a flow line) can enhance removal of one or more wellbore analytes (e.g., to increase the safety of an operator). Other configurations (e.g., parallel) of multiple reactive filter material may additionally be desirable, particularly when the reactive filter material forms a sensor, as described in detail below.

In some embodiments, the reactive filter material is a sorbent material selective to a particular wellbore analyte. As used herein, the term "sorbent," and grammatical variants thereof, refers to a substance that has the property of collecting another substance (e.g., molecules of another substance) by sorption. The sorbents described herein sorb (that is "collect" or "trap") liquid or gaseous (collectively "fluids," and grammatical variants thereof) wellbore analytes. When the sorbent (or reactive filter material) is a liquid, it must be supported by a supporting material or otherwise encased such that it is able to sorb a wellbore analyte without dispersing from the desired location within a fluid flow line. By way of example, the liquid may be distributed in a solvent and then pumped through a porous material, with the liquid being trapped by capillary forces. In another example, the solvent may be evaporated off, wherein "reactive filter material" is designed to bind to the surface of the porous media during the evaporation process. Desorption of a wellbore analyte from the reactive filter (e.g., from the sorbent) may also be achieved, such as for use in measuring certain qualitative and/or quantitative characteristics of the wellbore analyte, as discussed in greater detail with reference to the sensors of the present disclosure. The reactive filter material may be permeable or semi-permeable.

The reactive filter sorbents (or simply "sorbent") described herein may be in solid form (e.g., particulate or powdered form) or in liquid form. In some embodiments, the reactive filter sorbent is present in a fluid flow line, as described herein, in the presence of a support material, which may also serve to form the micro-fibrous entrapped sorbent material described below if in micro-fibrous form. The support material at least operates to stabilize or support the sorbent for use in a fluid flow line, maintaining it in a particular position, and retaining its capacity. For example, the sorbent may be stabilized in the pores of a porous support material, may be stabilized by attraction between the sorbent and the support material remain coherently together, or may be stabilized by being surrounded by the support material (e.g., a porous material that allows fluid to flow through but does not allow the sorbent to disperse). Support material may include, but is not limited to, a polymer, a ceramic, a glass, a metal, a metal alloy, and any combination thereof. Specific examples of suitable support materials include, but are not limited to, quartz wool, glass wool, silica, calcium permanganate, lanthanum oxide, mayenite, alumina, hydrated alumina, an aluminosilicate, a clay, zirconia, titania, a metal (e.g., forming a metal-organic framework), and any combination thereof. Other porous or mesoporous materials may also be used, without departing from the scope of the present disclosure. The support material may, accordingly, be in the form of a foam, a honeycomb, a porous media, and the like, and any combination thereof. The selected support material is preferably inert, thereby not affecting the ability of the reactive filter sorbent to sorb one or more analytes of interest.

In some instances, a particular sorbent will sorb more than one type of wellbore analyte. This may be particularly beneficial where the reactive filter sorbent is placed within a formation tester to sorb deleterious (or non-deleterious) wellbore analytes to protect an operator and/or the environment. In such instances, a single sorbent may be used to remove or reduce exposure to multiple wellbore analytes. In other embodiments, the wellbore filter sorbent is selected such that it only is able to sorb a single wellbore analyte, such as when qualitative or quantitative analysis of a particular wellbore analyte is desired, which may be the case when the wellbore filter material is used as part of a sensor, for example.

The sorbents of the present disclosure are designed to sorb one or more wellbore analytes including, but not limited to, mercury, hydrogen sulfide, a salt, carbon dioxide, and any combination thereof. These wellbore analytes may be deleterious or otherwise influence wellbore operations, which can be compensated for if their presence and/or amount, for example, are known. Suitable materials for forming the mercury reactive filter sorbents described herein include, but are not limited to, activated carbon, an iodine-impregnated activated carbon, metal impregnated activated carbon (using metals such as copper, silver, gold, or an alloy of all three metals), sulfur-impregnated activated carbon, boron-impregnated activated carbon, a zeolite material (e.g., a clinoptilolite zeolite material), fly ash, a transition metal oxide, a transition metal sulfide, an alkaline earth metal oxide, an alkaline earth metal sulfide, An organic sulfide (d-limonene polysulfide) and any combination thereof. Impregnated activated carbons have incorporated into the activated carbon (e.g., into the porous openings of the activated carbon) one or more other substances.

Suitable materials for forming the hydrogen sulfide reactive filter sorbents of the present disclosure include, but are not limited to, iron (or an iron-containing compound), steel wool, a metal oxide (e.g., zinc oxide, calcium oxide, magnesium oxide, aluminum oxide, copper oxide, nickel oxide, cobalt oxide, iron oxide, tin oxide, silver oxide, manganese oxide, zirconium oxide, molybdenum oxide, and any combination thereof), mineral feroxyhite, silver nitrate, manganese ore, activated carbon, sodium hydroxide-impregnated activated carbon, potassium hydroxide-impregnated activated carbon, potassium iodide-impregnated activated carbon, potassium permanganate-impregnated activated carbon, potassium carbonate-impregnated activated carbon, sodium carbonate-impregnated activated carbon, a zeolite material (e.g., mordenite, clinoptilolite, erionite, phillipsite, ferrierite zeolite materials), mesoporous silica, and any combination thereof. Examples of suitable metal oxide combinations include, but are not limited to, cobalt-zinc-aluminum oxide, zinc-cobalt oxide, zinc-iron oxide, zinc-nickel oxide, zinc-manganese oxide, zinc-iron-zirconium oxide, zinc-tin-zirconium oxide, zinc-copper-zirconium oxide, zinc-cobalt-aluminum oxide, zinc-aluminum oxide. As an example, 50 grams (g) of an iron reactive filter material configured to occupy 15 milliliters (mL) of space in a fluid flow line would filter 200 liters (L) of a fluid containing 200 ppm of hydrogen sulfide. Thus, the required weight and/or volume of a reactive filter material (e.g., iron) is proportional to the volume of fluid and expected analyte concentration, where lower concentrations of the analyte necessarily require less weight and/or volume of reactive filter material.

Suitable salt reactive filter sorbents include, but are not limited to, activated carbon, calcite, silica (preferably having a unit mesh size of less than 2.5 micrometers (μm)), quartz gravel (preferably having a unit mesh size of less than 7.5 centimeters (cm)), activated alumina, and any combination thereof. Salt reactive filter material sorbents can be selected based on particular halogens, for example. As used herein, the term "unit mesh size," and grammatical variants thereof, refers to a size of an object that is able to pass through a square area having each side thereof equal to a specified numerical value.

Examples of suitable carbon dioxide sorbents include, but are not limited to, activated carbon, a carbon-based compound, a zeolite, silica (e.g., mesoporous silica), an amine (e.g., an alkoxyamine, monoethanolamine, an amine-impregnated solid, and the like), a metal oxide (e.g., calcium oxide), a metal hydroxide (e.g., lithium hydroxide, sodium hydroxide, magnesium silicate hydroxide, potassium hydroxide), serpentinite, magnesium iron silicate, soda lime, lithium zirconate, a frustrated Lewis pair compound, potassium carbonate, sodium carbonate, and any combination thereof.

In some embodiments, the reactive filter material is a micro-fibrous entrapped sorbent material selective to the analyte of interest. As used herein, the term "micro-fibrous entrapped sorbent material," and grammatical variants thereof (including simply "micro-fibrous entrapped sorbent"), refers to one or more sorbents (e.g., those described above) entrapped in a micro-fibrous media designed to enhance sorption efficiency compared to the sorbent alone. Advantages of the MFESs include, but are not limited to, uniform velocity profiles, minimized channeling, high thermal conductivity, fast heat transfer, near isothermal temperature profiles, and the like, and any combination thereof. For example, Micro-fibrous entrapped sorbents (MFESs) can be used to achieve increased sorption kinetics (e.g., adsorption kinetics or contacting efficiency) and a low pressure drop. Because the MFESs are highly porous in nature, the pressure drop of the MFESs can be reduced by ⅛ to ½ compared to other sorbent-packed support material.

The micro-fibrous media forming the MFESs described herein and for use in a fluid flow line related to a subterranean formation operation or within a wellbore tool (e.g., a formation tester) alone or in combination with forming a sensor comprises a highly-porous, fibrous support structure of entrapped sorbents. The micro-fibrous media may additionally be sintered and non-woven. Other materials may additionally be included in the micro-fibrous media, as desired, such as catalysts, without departing from the scope of the present disclosure. Accordingly, the sorbents and any additional materials are in a fixed-fluidized bed configuration and that are fibrous in shape. The micro-fibrous media, like the support material described above, may be composed of a material including, but not limited to, a polymer, a ceramic, a glass, a metal, a metal alloy, and any combination thereof. The selected material for forming the micro-fibrous media will depend on the particular location of the reactive filter material (e.g., fluid flow, fluid flow type (e.g., conductivity of the fluid), temperature, corrosiveness, and the like), the particular wellbore analyte(s) of interest, and cost considerations. For example, micro-fibrous media made of ceramic or glass fibrous materials in highly corrosive environments, polymer fibrous materials in low-cost operations, metal and metal alloy fibrous materials in high temperature and/or electrically conductive environments of fluid flow properties, and the like.

Sintering of the micro-fibrous media can be used to stabilize the micro-fibrous media to provide a support structure for the sorbent(s) and any additional materials, as needed. Sintering using mechanical welding to stabilize the micro-fibrous media fibers, and when the micro-fibrous media is a metal or a metal alloy, can intimate thermal and electrical contact, thereby enhancing the media's thermal and electrical properties.

The micro-fibrous media fibers dominate the flow pattern of fluid flowing through the MFESs, thus producing a uniform-velocity flow profile without channeling. Additionally, MFESs have lower volumetric saturation capacity compared to other sorbent-packed support material because they have lower volumetric sorbent loadings. For example, the MFESs can have a volumetric sorbent loading of up to 35%. In some situations, where a two beam method is used, a sorbent loading of 0% may be used as a control/compare sample. In such instances, an unloaded surface is used alongside a reactive surface for comparison that allows for differential detection of the analyte on the reactive surface. In other sorbent-packed support material beds can have a volumetric sorbent loading of 60-70%. This decrease is volumetric loading is counteracted by enhanced sorption efficiency and lower pressure drop.

Small particle sorbent sizes can additionally be used without compromising sorption so long as the particles are firmly attached to a support media. The lower end of the sized distribution is limited by chemistry used to create the particles, and the ability to quench the reactions. In some cases the particle may be only 2 to 5 atomics diameters of a metal atom thick, deposited by Atomic layer deposition. Advantages of such small sorbents include, but are not limited to, high surface area, reduced inter-sorbent (particle) diffusion resistance, fast mass transfer, and orientation independence, and the like, and any combination thereof.

A particular application of the MFESs described herein is as a thin polishing layer at a downstream end of a non-micro-fibrous sorbent-packed support material. As used herein, the term "polishing layer," and grammatical variants thereof, refers to a layer of MFES material in serial with a non-micro-fibrous sorbent-packed support material. Accordingly, one or more non-micro-fibrous sorbent-packed support materials, as described above, is used in concert with a micro-fibrous entrapped sorbent material, where both materials are in close proximity or physically adjacent (i.e., in contact) with one another. Combining the two types of reactive filter materials can increase breakthrough time by three-times longer than the non-micro-fibrous sorbent-packed support material alone, without significantly increasing the length or size of the reactive sorbent material as a whole. As used herein, the term "breakthrough time," and grammatical variants thereof, refers to the elapsed time between initial contact of a wellbore analyte with a reactive filter material and the time at which the reactive filter material can no longer retain additional wellbore analyte.

As an example, the MFESs described herein may be used in a fluid flow line to remove hydrogen sulfide (e.g., in a gas stream, in a wellbore fluid stream (e.g., a hydrocarbon), and the like). Such uses have been commercially available to prevent poisoning of anode catalysts in fuel cells. An example of a suitably available MFES for such use includes the $H_2F$ Fuel Cell Sorbent Filter, available from IntraMicron, Inc. in Auburn, Ala. This fuel cell sorbent filter is small and easily adaptable for subterranean formation operation use (e.g., in a flow line downhole or at surface, or in a flow line in a wellbore tool, such as a formation tester). For example, the MFESs described herein, or the commercially available fuel cell sorbent filter itself, can be placed in a flow line, such as to begin removal of hydrogen sulfide for enhanced probe selection (EPS) to begin as soon as a fluid enters a wireline tool. For use with liquids, commercially available $H_2F$ Fuel Cell Sorbent Filter is rated for ≥60 milligrams (mg) of hydrogen sulfide adsorption to provide ≤0.01 parts per million (ppm) purity for 2820 minutes for a 1 kilowatt (kW) fuel cell at 15 ligers of hydrogen gas ($H_2$) per minute with a 1 ppm hydrogen sulfide background. For use with gases, the commercial item has polished 15*2820=37800 std liters of gas. At a reservoir pressure of 5000 psi this volume of gas is reduced as a PV=PV of approximately 113 liters. Such a system would be reasonable for sampling more than 1 point with in a well bore; however, if longer times or higher levels are expected, larger diameter and longer lengths of the Media may be necessary. Increasing the diameter would reduce local flow rate and increase capacity, and once diameter is fixed, the length should be set to be proportional to absorption capacity.

Similar or better results for other wellbore analytes, depending on the type of reactive filter MFES selected, is expected for use in the subterranean formation operations described herein (i.e., in a fluid flow line related thereto). For example, wireline reservoir description tools (RDTs) typically have flow rates of about 4 milliliters per second (mL/s) in tight formations, and up to about 40 mL/s in high permeability formations. This is thus less than the flow rate described above with reference to the commercially available $H_2F$ Fuel Cell Sorbent Filter (e.g., an RDT average of 18 mL/s is 15 times less than the flow rate of the fuel cell). Accordingly, an MFES in a flow line used in a subterranean formation operation (e.g., wireline flow line) could remove about 60 mg or more of hydrogen sulfide over $4.23 \times 10^5$ min (or 705 hours). At high hydrogen sulfide concentrations, such as about 30 ppm in typical subterranean formation operations (e.g., wellbore fluid flow lines), the sorption of the hydrogen sulfide time would decrease to about 24 hours.

In some embodiments, a plurality (two or more) reactive filter materials are included in a cartridge configuration, such that the particular reactive filter material provided in a fluid flow path can be selectively chosen by an operator, or can be "refreshed" (i.e., by moving to a new filter material) between pumpouts for obtaining formation samples in a formation tester, for example. In such a way, a single cartridge containing multiple reactive filter materials, whether the same or different, can be used selectively in a particular fluid flow line, or during certain stages of fluid flow in the fluid flow line, or at certain zonal locations throughout the fluid flow line. Accordingly, the cartridge configuration may be constructed of individual reactive filter materials, as described herein, designed to selectively and individually encounter a fluid in a fluid flow line. As an example, the cartridge configuration could be in the form of an in-line valve assembly, where each reactive filter material is inserted into a particular valve section that is selectable (e.g., by turning the valve). The last filter in the cartridge can thus pass the fluid in the fluid flow line to an exit of the assembly. A bypass line, preferably concentric with the valve assembly, and additionally be used to select which filter or filters to encounter the fluid flow line.

For example, in some embodiments, the cartridge configuration is in the form of a valve assembly having three states with three reactive filter materials (the same or different). In some embodiments, the filter may (1) pass fluid through a reactive filter material to a common line, (2) pass fluid through a reactive filter material and also serve as a bypass for downstream reactive filter materials, (3) pass fluid to bypass the instantly selected reactive filter material and to the subsequent reactive filter material in-line. Switching from one reactive filter material to the next reactive filter material can be an automated process, such as upon detecting a signal (e.g., sorbent spectrum) drop across the reactive filter material indicating that it has consumed the maximum amount of analyte. A fourth state could also exist, where the fluid is passed into a line that does not have a reactive filter material, such as when removal or measurement of a particular analyte is not desirable, or when each of the reactive filter materials have been spent. Accordingly, by use of the cartridge configuration, the amount of analyte removed or sorbed from a wellbore fluid can be maximized in a relatively small space within the fluid flow line. The last in-line reactive filter material would open to the bypass line, as previously described.

The selection of each filter can be achieved using an isolation valve, where fluid is allowed to pass over a single reactive filter material in the cartridge only if the isolation valve allows such passage. In some embodiments, the isolation valve can be a toggle valve. For example, between each reactive filter material, and in front of the first, the toggle valve can be used to direct flow to either a bypass or the next reactive filter material. The toggle valve can be controlled automatically, electrically, or manually, without departing from the scope of the present disclosure, or may be otherwise functionally incorporated into the valve assembly. The valve assembly may be a three-way valve or a six-way valve configuration, for example, although other configurations may also be utilized, without departing from the scope of the present disclosure.

Figure 3A:
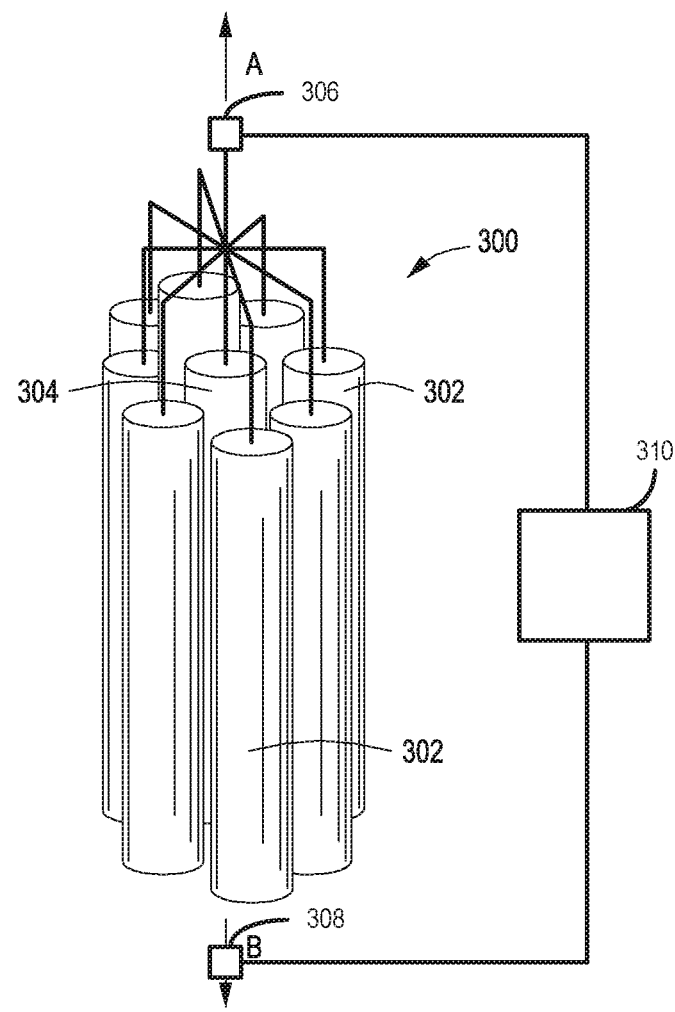
FIGS. 3A and 3B are a cartridge configuration comprising a plurality of reactive filter materials according to one or more embodiments of the present disclosure.
Figure 3B:
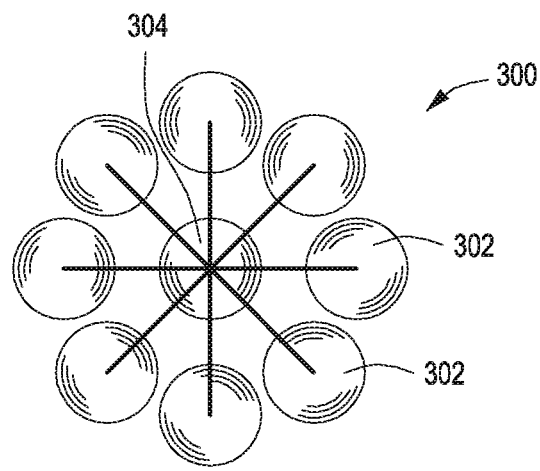

Referring now to FIGS. 3A and 3B, illustrated is a cartridge configuration 300 comprising a plurality of reactive filter materials according to one or more embodiments of the present disclosure, where FIG. 3A is a side-view and FIG. 3B is a top-view. As shown in FIG. 3A, the cartridge configuration 300 may be part of a wellbore tool (e.g., a formation tester, and enhanced probe section thereof, and the like), where "A" is toward the top of the tool and "B" is toward the bottom of the tool. In some embodiments, a detector 306 (e.g., a micro-ICE) communicatively coupled to a processing unit 310 can be located in the "A" direction, or upstream of the cartridge 300, and a pump that removes wellbore fluid can be located in the "B" direction. In such instances, the detector (micro-ICE) can be used to measure fluid components (e.g., analytes) prior to contact with the reactive filter material 302. Other configurations are also permissive, such as having a detector 308 communicatively coupled to a processing unit 310 in the "B" direction and capable of determining a sorption spectrum from one or more of the reactive filter materials 302 after fluid flow through, or a combination of a detector at both locations, without departing from the scope of the present disclosure. As shown, eight (8) reactive filter materials 302 are arranged in a star-like pattern relative to each other. The reactive filter materials 302 are arranged about a bypass 304, which operates to divert fluid away from one or more reactive filter materials 302 or to one or more reactive filter materials 302, as described above. It is to be appreciated that although eight (8) reactive filter materials 302 are shown, any plurality (two or more) of reactive filter materials 302 may be used in a cartridge configuration 300, as previously described, without departing from the scope of the present disclosure.

After completion of a particular job (e.g., use of a formation tester), the cartridge of reactive filter materials can be retrieved to the surface, as previously stated, and weighed for analyte sorption (e.g., adsorption) compared to their pre-job weight. The weight of the total analyte sorbed in conjunction with the volume of fluid (e.g., gas or liquid fluid) pumped through each (or the total number) of the reactive filter materials can be used to determine the concentration of the sorbed analyte. For example, Equations 1-3 below can be used to determine the concentration of a particular analyte:

$$analyte_{wt} = RFM_{awt} - RFM_{iwt} \quad \text{Equation 1}$$

$$fluid_{vol} = RFM_{pump\ rate} * \text{pumpout time} \quad \text{Equation 2}$$

$$analyte_{con} = analyte_{wt}/fluid_{vol} \quad \text{Equation 3}$$

where "$analyte_{wt}$" is the final weight of the analyte after subtracting the initial weight of reactive filter material, "$RFM_{iwt}$" from the final weight of the reactive filter material, "$RFM_{awt}$" (e.g., after retrieval of the reactive filter material to the surface); "$fluid_{vol}$" is the volume of the fluid flowed through the reactive filter material (and thus the fluid flow line in which the reactive filter material is located) and is based on the pump rate (e.g., mL/s) through the reactive filter material, "$RFM_{pump\ rate}$" and the time through which the fluid is pumped through the reactive filter material, "pumpout time;" and the "$analyte_{con}$" is the final concentration of the analyte present in the fluid flowed through the reactive filter material.

As previously described, in some embodiments, the reactive filter material (whether a sorbent, a MFES, or a combination thereof) can be used as part of a sensor for measuring a qualitative or quantitative characteristic of an analyte in a wellbore fluid, as described above. The sensors described herein are designed to have increased sensitivity to such wellbore analytes based on evaluation of their sorption spectrum. As used herein, the term "sorption spectrum" refers to any detectable spectrum (e.g., optical, acoustic, and the like, and as described below with reference to the detectors of the present disclosure) resulting from contact or reaction of a reactive filter material and an analyte (e.g., a wellbore analyte).

All analytical sensors face compromises in design, experiencing tradeoffs between sensitivity and specificity. In subterranean formation operations, such as in downhole environments, measurements are often pushed to the limit of their sensitivity for a particular analyte (e.g., sensors utilizing ion selective electrodes, resistivity, capacitance, optics, and the like). To make an analytical sensor specific to a particular analyte in an undiscerning background (i.e., the analyte of interest is amongst other chemicals, and itself may or may not be present), often much sensitivity is sacrificed. As an example, a hydrogen sulfide analyte is optically active (i.e., produces an optical sorption spectrum), but is affected multiple interferences. For example, water, carbon dioxide, methane, and combinations thereof, at least, render isolation of the infrared (IR) region of hydrogen sulfide difficult. Additionally, mercaptans interfere with isolation of both the IR and ultraviolet (UV) spectrums of hydrogen sulfide. Multivariate regression is able to remove such interference using mathematical means, but the technique is limited in practical terms by the required sensitivity of the measurement.

Advantageously, the sensors of the present disclosure enhance sensitivity by employing a reactive filter material that is selective to a particular analyte, by sorption of the particular analyte, by selectively filtering interferences against said analyte, or both. Accordingly, the sensors described herein can be used to measure qualitatively or quantitatively (e.g., using differential measurements) a desired wellbore analyte. The sensors of the present disclosure comprise at least one reactive filter material, which sorbs an analyte in a wellbore fluid in a flow line, as described above. In addition, the sensor comprises at least one detector that detects a sorption spectrum specific to the analyte at least a first and a second location, wherein the first location is upstream in the flow line relative to the second location. The detector further calculates a balanced measurement corresponding to the presence of the analyte in the wellbore fluid. In some embodiments, a secondary device other than the detector can be used to calculate the balanced measurement, without departing from the scope of the present disclosure. Examples of suitable detectors include, but are not limited to, optical detectors, electrode detectors, resistivity detectors, NMR detectors, acoustic detectors, capacitance detectors, an integrated computational element (ICE) detector as well as magnetic and inductive detectors (available from Halliburton Energy Services, Inc. in Houston, Tex.), and any combination thereof.

Accordingly, where two locations on the filter are detected, the wellbore fluid flowing initially past the first location will have a greater amount of the wellbore analyte than once the wellbore fluid passes the second location because the reactive filter material will have sorbed all or some of the wellbore analyte at the first location. Accordingly, a balanced measurement can be achieved by comparing the sorption spectrum of the first location to the sorption spectrum of the second location. In some embodiments, the entirety of the analyte is sorbed at the first location of the reactive filter material and only the interference associated with the flowing fluid (and not the analyte) is measured at the second location, thereby allowing complete cancellation of the interference to allow further analysis related to the analyte. In other embodiments, greater than two locations are measured, where each location progressively removes the analyte from the flowing fluid until the final (or more than one later) measurements is only interference, thereby increasingly removing the analyte from the flowing fluid. Accordingly, the detected sorption spectrum by the at least one detector at the two or more locations along a length of a reactive filter material is specifically due to sorption of the analyte of interest only.

In other embodiments, rather than the reactive filter material being designed to sorb the analyte of interest, one or more known interference compounds could be sorbed to the reactive filter material, without departing from the scope of the present disclosure. In a similar manner, then, the presence, qualitatively or quantitatively, of the known analyte could be measured using the sensor. It is to be appreciated, however, that because interference compounds may be numerous, selectivity of the reactive filter material to a desired analyte (e.g., wellbore analyte) may be preferred.

As a practical example, as previously described, iron can be used as a reactive filter material for detecting the analyte hydrogen sulfide. Iron is selectively reactive with hydrogen sulfide, and at a fast rate, whereas the known interferents carbon dioxide, methane, and mercaptans are not reactive with iron. Additionally, a water interferent is reactive with iron in an oxidizing environment, but only at a slow rate, which can be distinguished from the iron's reaction with hydrogen sulfide; moreover, water is not reactive in most reducing environments where hydrogen sulfide would be present. Hydrogen sulfide would convert to sulfate in an oxidizing environment. Accordingly, a steel wool reactive filter material could be placed in a fluid flow line and the presence of hydrogen sulfide could be determined by obtaining a balanced measurement with a detector based on a sorption spectrum at a first location of the reactive filter material upstream of a sorption spectrum at a second location of the reactive filter material.

In some embodiments, rather than flowing a wellbore fluid in a fluid flow line through at least two locations of a single reactive filter material, a pair (or a plurality) of reactive filter materials can be used in the sensors of the present disclosure to achieve the same result. Furthermore, a reactive filter material selective to a particular analyte can be combined in serial (in-line) with another material that is not selective (although which may be sensitive) to the desired analyte, and the detected difference is sorption spectra would be selective to the desired analyte. For example, if the analyte was hydrogen sulfide, a selective steel wool reactive filter could be placed in a fluid flow line upstream or downstream of another reactive filter material (or sensor) that is not selective to hydrogen sulfide. The sorption spectra signal differential is thus inferred to be due to the hydrogen sulfide analyte, thus signaling the presence of the analyte. In other embodiments, a plurality of reactive filter materials may be arranged parallel (not in series) in a fluid line such that the fluid passes separately through the reactive filter materials (not first through one, then through a second, etc.). In such parallel arrangements, for example, multiple types of analytes could be sorbed simultaneously, without departing from the scope of the present disclosure.

Aspects and examples disclosed herein include:

Embodiment A

A sensor comprising: at least one reactive filter material arranged in a flow line, wherein the reactive filter material sorbs an analyte in a wellbore fluid in the flow line; and at least one detector that detects a sorption signal specific to the analyte at at least a first location and a second location of the reactive filter material, wherein the first location is upstream in the flow line relative to the second location, wherein the detector either (1) calculates a balanced measurement corresponding to the presence of the analyte in the wellbore or (2) relays the measurements to a signal processing unit to calculate a balanced measurement corresponding to the presence of the analyte in the wellbore.

Embodiment B

A method comprising: introducing a sensor into a flow line in a wellbore in a subterranean formation, the sensor comprising: at least one reactive filter material arranged in a flow line, wherein the reactive filter material sorbs an analyte in a wellbore fluid in the flow line; and at least one detector that detects a sorption signal specific to the analyte at at least a first location and a second location of the reactive filter material, wherein the first location is upstream in the flow line relative to the second location; flowing a wellbore fluid through the flow line, wherein the wellbore fluid first contacts the first location and thereafter contacts the second location of the reactive filter material; and calculating a balanced measurement with the detector corresponding to the presence of the analyte in the wellbore fluid.

Embodiment C

A system comprising: a wellbore extending in a subterranean formation; and a sensor placed in the wellbore, the sensor comprising: at least one reactive filter material arranged in a flow line, wherein the reactive filter material sorbs an analyte in a wellbore fluid in the flow line; and at least one detector that detects a sorption signal specific to the analyte at at least a first location and a second location of the reactive filter material, wherein the first location is upstream in the flow line relative to the second location, and calculates a balanced measurement corresponding to the presence of the analyte in the wellbore fluid.

Embodiments A, B, and C may have one or more of the following additional elements in any combination:

Element 1: Wherein the flow line is in a formation tester.

Element 2: Wherein the flow line is in a formation tester and the flow line further comprises at least one sample chamber, and the sensor is in the flow line downstream of the sample chamber.

Element 3: Wherein the flow line is in a formation tester and the flow line further comprises at least one sample chamber, and the sensor is in the flow line downstream of the sample chamber adjacent to an exit end of the flow line.

Element 4: Wherein the balanced measurement corresponding to the presence of the analyte in the wellbore fluid is a quantitative or qualitative concentration.

Element 5: Wherein the sensor comprises a plurality of reactive filter materials of the same type.

Element 6: Wherein the sensor comprises a plurality of reactive filter materials of at least two different types.

Element 7: Wherein the reactive filter material is a sorbent material sensitive to the analyte.

Element 8: Wherein the analyte is selected from the group consisting of mercury, hydrogen sulfide, a salt, carbon dioxide, and any combination thereof.

By way of non-limiting example, exemplary combinations applicable to A, B, and C include: Any of A, B, and/or C with Elements 1-8; 1 and 2; 1 and 3; 1 and 4; 1 and 5; 1 and 6; 1 and 7; 1 and 8; 2 and 3; 2 and 4; 2 and 5; 2 and 6; 2 and 7; 2 and 8; 3 and 4; 3 and 5; 3 and 6; 3 and 7; 3 and 8; 4 and 5; 4 and 6; 4 and 7; 4 and 8; 5 and 6; 5 and 7; 5 and 8; 6 and 7; 6 and 8; 7 and 8; 1, 2, and 3; 1, 2, and 4; 1, 2, and 5; 1, 2, and 6; 1, 2, and 7; 1, 2, and 8; 2, 3, and 4; 2, 3, and 5; 2, 3, and 6; 2, 3, and 7; 2, 3, and 8; 3, 4, and 5; 3, 4, and 6; 3, 4, and 7; 3, 4, and 8; 4, 5, and 6; 4, 5, and 7; 4, 5, and 8; 2, 3, 4, and 6; 3, 4, 5, and 8; 1, 2, 3 and 4; 3, 6, 7, and 8; 1, 4, 6, and 8; and the like; and any combination of 1-8, without limitation.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A sensor comprising: at least one reactive filter material arranged in a flow line, wherein the at least one reactive filter material sorbs an analyte in a wellbore fluid in the flow line; and a first detector that detects a first sorption signal specific to the analyte at a first location upstream of the at least one reactive filter material and a second detector that detects a second sorption signal specific to the analyte at a second location downstream of the at least one reactive filter material, wherein the sensor either calculates a balanced measurement corresponding to the presence of the analyte in the wellbore or relays the first sorption signal and the second sorption signal to a signal processing unit configured to calculate the balanced measurement corresponding to the presence of the analyte in the wellbore; wherein the calculation of the balanced measurement is based on the first sorption signal and the second sorption signal.

2. The sensor of claim 1, wherein the flow line is in a formation tester.

3. The sensor of claim 1, wherein the flow line is in a formation tester and the flow line further comprises at least one sample chamber, and the sensor is in the flow line downstream of the sample chamber.

4. The sensor of claim 1, wherein the balanced measurement corresponding to the presence of the analyte in the wellbore fluid is a quantitative or qualitative concentration.

5. The sensor of claim 1, wherein the sensor comprises a plurality of reactive filter materials of the same type.

6. The sensor of claim 1, wherein the sensor comprises a plurality of reactive filter materials of at least two different types.

7. The sensor of claim 1, wherein the at least one reactive filter material is a sorbent material sensitive to the analyte.

8. The sensor of claim 1, wherein the analyte is selected from the group consisting of mercury, hydrogen sulfide, a salt, carbon dioxide, and any combination thereof.

9. The sensor of claim 1, wherein the second detector that detects the second sorption signal at the second location comprises the second detector to detect a measurement of interference of the wellbore fluid with the analyte removed, and wherein calculation of the balanced measurement is based on a comparison of the first sorption signal detected at the first location and the second sorption signal detected at the second location.

10. The sensor of claim 9, wherein the first detector that detects the first sorption signal at the first location comprises the first detector to detect an interference at the first location that is the same as the interference detected at the second location.

11. A method comprising: introducing a sensor into a flow line in a wellbore in a subterranean formation, the sensor comprising: at least one reactive material arranged in the flow line, wherein the at least one reactive filter material sorbs an analyte in a wellbore fluid in the flow line; and a first detector that detects a first sorption signal specific to the analyte at a first location upstream of the at least one reactive filter material and a second detector that detects a second sorption signal specific to the analyte at a second location downstream of the at least one reactive filter material; flowing the wellbore fluid through the flow line, wherein the wellbore fluid first contacts the first location and thereafter contacts the second location; and calculating a balanced measurement with the sensor corresponding to the presence of the analyte in the wellbore fluid; wherein the calculation of the balanced measurement is based on the first sorption signal and the second sorption signal.

12. The method of claim 11, wherein the flow line is in a formation tester.

13. The method of claim 11, wherein the flow line is in a formation tester and the flow line further comprises at least one sample chamber, and the sensor is in the flow line downstream of the sample chamber.

14. The method of claim 11, wherein the balanced measurement corresponding to the presence of the analyte in the wellbore fluid is a quantitative or qualitative concentration.

15. The method of claim 11, wherein the sensor comprises a plurality of reactive filter materials of the same type.

16. The method of claim 11, wherein the sensor comprises a plurality of reactive filter materials of at least two different types.

17. The method of claim 11, wherein the at least one reactive filter material is a sorbent material sensitive to the analyte.

18. The method of claim 11, wherein the analyte is selected from the group consisting of mercury, hydrogen sulfide, a salt, carbon dioxide, and any combination thereof.

19. The method of claim 11, wherein the second detector that detects the second sorption signal at the second location comprises the second detector to detect a measurement of interference of the wellbore fluid with the analyte removed, and wherein calculating the balanced measurement comprises calculating the balanced measurement based on a comparison of the first sorption signal detected at the first location and the second sorption signal detected at the second location.

20. The method of claim 19, wherein the first detector that detects the first sorption signal at the first location comprises the first detector to detect an interference at the first location that is the same as the interference detected at the second location.

21. A system comprising: a sensor placed in a wellbore extending in a subterranean formation, the sensor comprising: at least one reactive filter material in a flow line, wherein the at least one reactive filter material sorbs an analyte in a wellbore fluid in the flow line; and a first detector that detects a first sorption signal specific to the analyte at a first location upstream of the at least one reactive filter material and a second detector that detects a second sorption signal at a second location downstream of the at least one reactive filter material, wherein the sensor calculates a balanced measurement corresponding to the presence of the analyte in the wellbore fluid; wherein the calculation of the balanced measurement is based on the first sorption signal and the second sorption signal.

22. The system of claim 21, wherein the flow line is in a formation tester.

23. The system of claim 21, wherein the second detector that detects the second sorption signal at the second location comprises the second detector to detect a measurement of interference of the wellbore fluid with the analyte removed, and wherein calculation of the balanced measurement is based on a comparison of the first sorption signal detected at the first location and the second sorption signal detected at the second location.

24. The system of claim 23, wherein the first detector that detects the first sorption signal at the first location comprises the first detector to detect an interference at the first location that is the same as the interference detected at the second location.

* * * * *